(12) United States Patent
Sato et al.

(10) Patent No.: US 11,299,237 B2
(45) Date of Patent: Apr. 12, 2022

(54) ELECTRONIC DEVICE AND METHOD FOR CONTROLLING ELECTRONIC DEVICE

(71) Applicant: Shimano Inc., Osaka (JP)

(72) Inventors: Taketoshi Sato, Osaka (JP); Hideki Ikemoto, Osaka (JP); Takao Harada, Osaka (JP); Daisuke Noborio, Osaka (JP); Kazuhiro Takeda, Osaka (JP); Ryuji Abe, Osaka (JP)

(73) Assignee: Shimano Inc., Osaka (JP)

( * ) Notice: Subject to any disclaimer, the term of this patent is extended or adjusted under 35 U.S.C. 154(b) by 202 days.

(21) Appl. No.: 16/709,329

(22) Filed: Dec. 10, 2019

(65) Prior Publication Data

US 2020/0115004 A1    Apr. 16, 2020

Related U.S. Application Data

(63) Continuation of application No. 15/811,307, filed on Nov. 13, 2017, now Pat. No. 10,556,638.

(30) Foreign Application Priority Data

Nov. 30, 2016    (JP) .............................. JP2016-232329

(51) Int. Cl.
  *B62M 6/55* (2010.01)
  *B62K 19/36* (2006.01)
  (Continued)

(52) U.S. Cl.
  CPC ................ *B62M 6/55* (2013.01); *B62J 6/165* (2020.02); *B62J 45/20* (2020.02); *B62K 19/36* (2013.01);
  (Continued)

(58) Field of Classification Search
  CPC .... B62M 6/45–90; B62M 9/12; B62M 25/08; B62J 6/02; B62J 45/10–20; B62J 6/165;
  (Continued)

(56) References Cited

U.S. PATENT DOCUMENTS 7,730,803 B2    6/2010 Takamoto
8,432,270 B2    4/2013 Lee et al.
(Continued)

FOREIGN PATENT DOCUMENTS

DE    20 2014 105 747 U1    2/2015
DE    20 2015 104 955 U1    10/2015
(Continued)

*Primary Examiner* — Calvin Cheung
(74) *Attorney, Agent, or Firm* — Global IP Counselors, LLP

(57) ABSTRACT

An electronic device comprises a wireless transmitter and an operation device. The operation device comprises a base, a brake lever, operation portions and an electronic controller. The base is to be removably attached to a handlebar. The operation portions includes first, second and third operation portions. The first operation portion is arranged on the base. The second and third operation portions are arranged adjacent to the brake lever and are disposed between the brake lever and the handlebar. At least one of the operation portions includes a lever. At least one of the operation portions includes a button. The electronic controller is configured to transmit an operation signal to the wireless transmitter upon operation of any of the operation portions to control at least one bicycle component that is any one of a shifting device, a brake device, an adjustable seatpost, a suspension and a drive unit.

16 Claims, 9 Drawing Sheets

(51) Int. Cl.
    *B62M 25/08*    (2006.01)
    *B62L 3/02*    (2006.01)
    *B62K 23/06*    (2006.01)
    *B62J 6/165*    (2020.01)
    *B62J 45/20*    (2020.01)
    *B62M 6/45*    (2010.01)
    *B62M 6/90*    (2010.01)
    *B62M 9/12*    (2006.01)
    *B62K 25/04*    (2006.01)
    *B62J 45/10*    (2020.01)
    *B62J 50/22*    (2020.01)
    *B62J 6/028*    (2020.01)

(52) U.S. Cl.
    CPC ............... B62K 23/06 (2013.01); B62L 3/02 (2013.01); B62M 6/45 (2013.01); B62M 6/90 (2013.01); B62M 9/12 (2013.01); B62M 25/08 (2013.01); *B60L 2200/12* (2013.01); *B62J 6/028* (2020.02); *B62J 45/10* (2020.02); *B62J 50/22* (2020.02); *B62K 2025/047* (2013.01); *B62K 2025/048* (2013.01)

(58) Field of Classification Search
    CPC .................... B62K 19/36; B62K 23/06; B62K 2025/047–048; B62L 3/02; B62L 2200/12
    See application file for complete search history.

(56) References Cited

U.S. PATENT DOCUMENTS

| | | | |
|---|---|---|---|
| 2006/0261785 A1* | 11/2006 | Horiuchi | H02J 7/1407 |
| | | | 322/7 |
| 2007/0207885 A1* | 9/2007 | Watarai | B62M 25/08 |
| | | | 474/70 |
| 2011/0011197 A1* | 1/2011 | Oku | B62M 25/04 |
| | | | 74/473.12 |
| 2012/0221203 A1 | 8/2012 | Ichida et al. | |
| 2012/0253601 A1* | 10/2012 | Ichida | B60G 17/0195 |
| | | | 701/37 |
| 2014/0102237 A1 | 4/2014 | Jordan et al. | |
| 2014/0345411 A1 | 11/2014 | Miki et al. | |
| 2015/0039165 A1* | 2/2015 | Fujita | B60W 10/08 |
| | | | 701/22 |
| 2015/0307157 A1* | 10/2015 | Gao | F16H 61/702 |
| | | | 701/52 |
| 2016/0016638 A1* | 1/2016 | Miyoshi | B62M 6/90 |
| | | | 701/22 |
| 2016/0121962 A1 | 5/2016 | Miyoshi et al. | |
| 2016/0272282 A1* | 9/2016 | Tsai | B62K 23/06 |
| 2016/0297499 A1* | 10/2016 | Ohashi | B62M 6/55 |
| 2017/0151999 A1* | 6/2017 | Kinpara | B62M 6/50 |

FOREIGN PATENT DOCUMENTS

| | | |
|---|---|---|
| DE | 10 2016 001 937 A1 | 9/2016 |
| EP | 3 056 415 A1 | 8/2016 |
| JP | 2012179974 A | 9/2012 |
| JP | 2016-088205 A | 5/2016 |
| TW | 200535043 A | 11/2005 |
| TW | 2012-40868 A | 10/2012 |
| TW | 201529405 A | 8/2015 |
| TW | 201637933 A | 11/2016 |
| WO | 2017/032894 A1 | 3/2017 |
| WO | 2017/091042 A1 | 6/2017 |

* cited by examiner

ELECTRONIC DEVICE AND METHOD FOR CONTROLLING ELECTRONIC DEVICE

CROSS-REFERENCE TO RELATED APPLICATIONS

This application is a continuation application of U.S. application Ser. No. 15/811,307, filed Nov. 13, 2017. The entire disclosure of U.S. application Ser. No. 15/811,307, filed Nov. 13, 2017, is hereby incorporated herein by reference. This application claims priority to Japanese Patent Application No. 2016-232329, filed on Nov. 30, 2016. The entire disclosure of Japanese Patent Application No. is hereby incorporated herein by reference.

BACKGROUND

Field of the Invention

The present invention relates to an electronic device and a method for controlling an electronic device.

Background Information

US Patent Application Publication No. 2014/0102237 (Patent publication 1) discloses an electric shifting device that includes an operation device and a shifting device. Operation of the operation device actuates the shifting device.

SUMMARY

An operation device for an electric shifting device is used only to actuate the shifting device. Further, to actuate the shifting device in a certain manner, the same operation always need to be performed with the operation device. It is an object of the present invention to provide an electronic device and a method for controlling an electronic device that contribute to improvement of the usability.

In accordance with an aspect of the present invention, an electronic device controls at least one bicycle component in correspondence with operation of an operation device. The electronic device comprises a wireless transmitter and the operation device. The operation device comprises a base, a brake lever, a plurality of operation portions and an electronic controller. The base is configured to be removably attached to a handlebar of a bicycle. The brake lever is pivotally coupled to the base. The plurality of operation portions are arranged on the base. The plurality of operation portions includes a first operation portion, a second operation portion and a third operation. The first operation portion is arranged on the base. The second operation portion and the third operation portion are arranged adjacent to the brake lever such that the second and third operation portions are disposed between the brake lever and the handlebar when the base is attached to the handlebar. At least one of the first, second and third operation portions includes an operation lever. At least one of the first, second and third operation portions includes a button. The electronic controller is electrically connected to the wireless transmitter. The electronic controller is configured to transmit an operation signal to the wireless transmitter upon operation of any of the plurality of operation portions to control the at least one bicycle component. The at least one bicycle component is any one of a shifting device, a brake device, an adjustable seatpost, a suspension and a drive unit that assists propulsion of the bicycle.

The electronic device and the method for controlling an electronic device contribute to the improvement of the usability.

BRIEF DESCRIPTION OF THE DRAWINGS

Referring now to the attached drawings which form a part of this original disclosure.

DETAILED DESCRIPTION OF EMBODIMENTS

The following description illustrates embodiments of an electronic device and a method for controlling an electronic device according to the present invention and is not intended to be restrictive. The embodiments of the electronic device can be modified. Further, two or more of the embodiments can be combined.

First Embodiment

Figure 1:
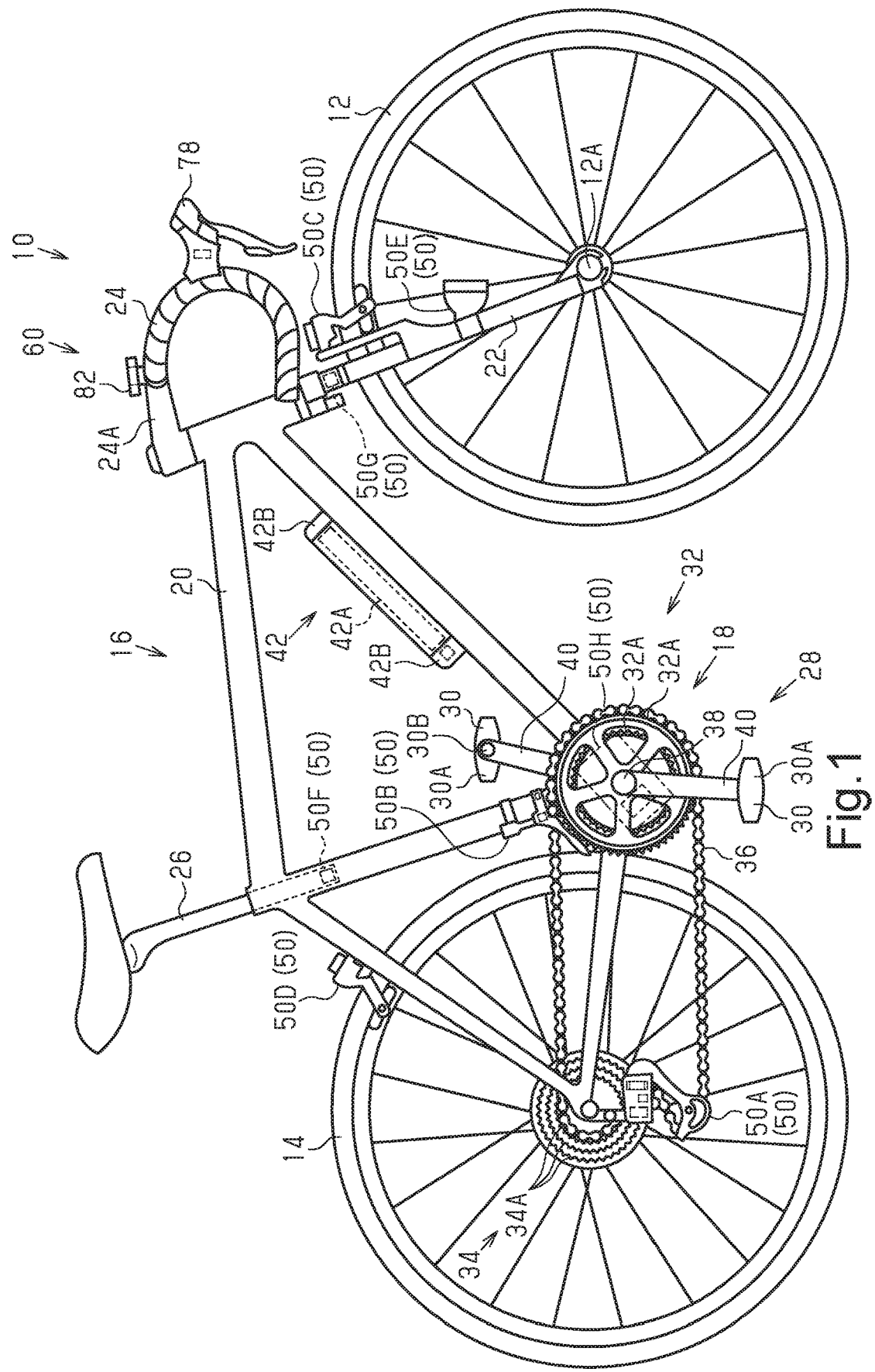
FIG. 1 is a side elevational view of a bicycle including an electronic device in accordance with a first embodiment.

A bicycle 10 including an electronic device 60 will now be described with reference to FIGS. 1 to 8. As shown in FIG. 1, the bicycle 10 includes a front wheel 12, a rear wheel 14, a bicycle body 16, a drive mechanism 18, a battery unit 42, bicycle components 50 and the electronic device 60. The bicycle body 16 includes a frame 20, a front fork 22, a handlebar 24 and a seatpost 26. The bicycle components 50 includes a first shifting device 50A, a second shifting device 50B, a front brake device 50C, a rear brake device 50D, a lamp 50E, an adjustable seatpost 50F, a suspension 50G, and a drive unit 50H. The front fork 22 is supported by the frame 20 and connected to an axle 12A of the front wheel 12. The handlebar 24 is connected in a removable manner to a stem 24A of the front fork 22. The seatpost 26 is connected to the frame 20 and supported by the frame 20.

Manual (human or muscular) power is transmitted via the drive mechanism 18 to the rear wheel 14 to move the bicycle 10. The drive mechanism 18 includes a crank 28, two pedals 30, a front rotor 32, a rear rotor 34, and a chain 36. If the crank 28 is provided on the drive unit 50H, the drive mechanism 18 can be configured to include part of the drive unit 50H. In this case, the drive mechanism 18 includes, for example, an output portion (not shown) of the drive unit 50H, and a coupling portion that couples a crankshaft 38 and the output portion of the drive unit 50H.

The crank 28 includes the crankshaft 38 and two crank arms 40. In the present embodiment, the crankshaft 38 is rotatably supported by a housing of the drive unit 50H that is coupled to the frame 20. The two crank arms 40 are coupled to the crankshaft 38. The two pedals 30 each include a pedal body 30A and a pedal shaft 30B. The pedal shaft 30B is coupled to the corresponding crank arm 40. The pedal body 30A is supported by the corresponding pedal shaft 30B in a state in which the pedal body 30A is rotatable relative to the pedal shaft 30B.

The front rotor 32 is coupled to the crankshaft 38. The front rotor 32 is coaxial with the crankshaft 38. The rear wheel 14 includes a hub (not shown). In the present embodiment, the front rotor 32 includes one or more front sprockets 32A. The rear rotor 34 includes one or more the rear sprockets 34A. The chain 36 is wound around the front rotor 32 and the rear rotor 34. The application of manual drive force to the pedals 30 rotates the crank 28 in one direction and rotates the rear wheel 14 in the same direction through the front rotor 32, the chain 36 and the rear rotor 34. In another example, the front rotor 32 includes one or more front pulleys, and the rear rotor 34 includes one or more rear pulleys coupled by a belt to the front rotor 32.

The battery unit 42 includes a battery 42A and a battery holder 42B that couples the battery 42A to the frame 20 so that the battery 42A is attachable to and removable from the frame 20. The battery 42A includes one or more battery cells. The battery 42A includes a rechargeable battery. The battery 42A supplies power to at least some of the bicycle components 50, which are connected by wires to the battery 42A. The battery unit 42 can be accommodated in the frame 20. At least some of the bicycle components 50 are not supplied with power from the battery 42A and are each provided with a battery instead.

Figure 3:
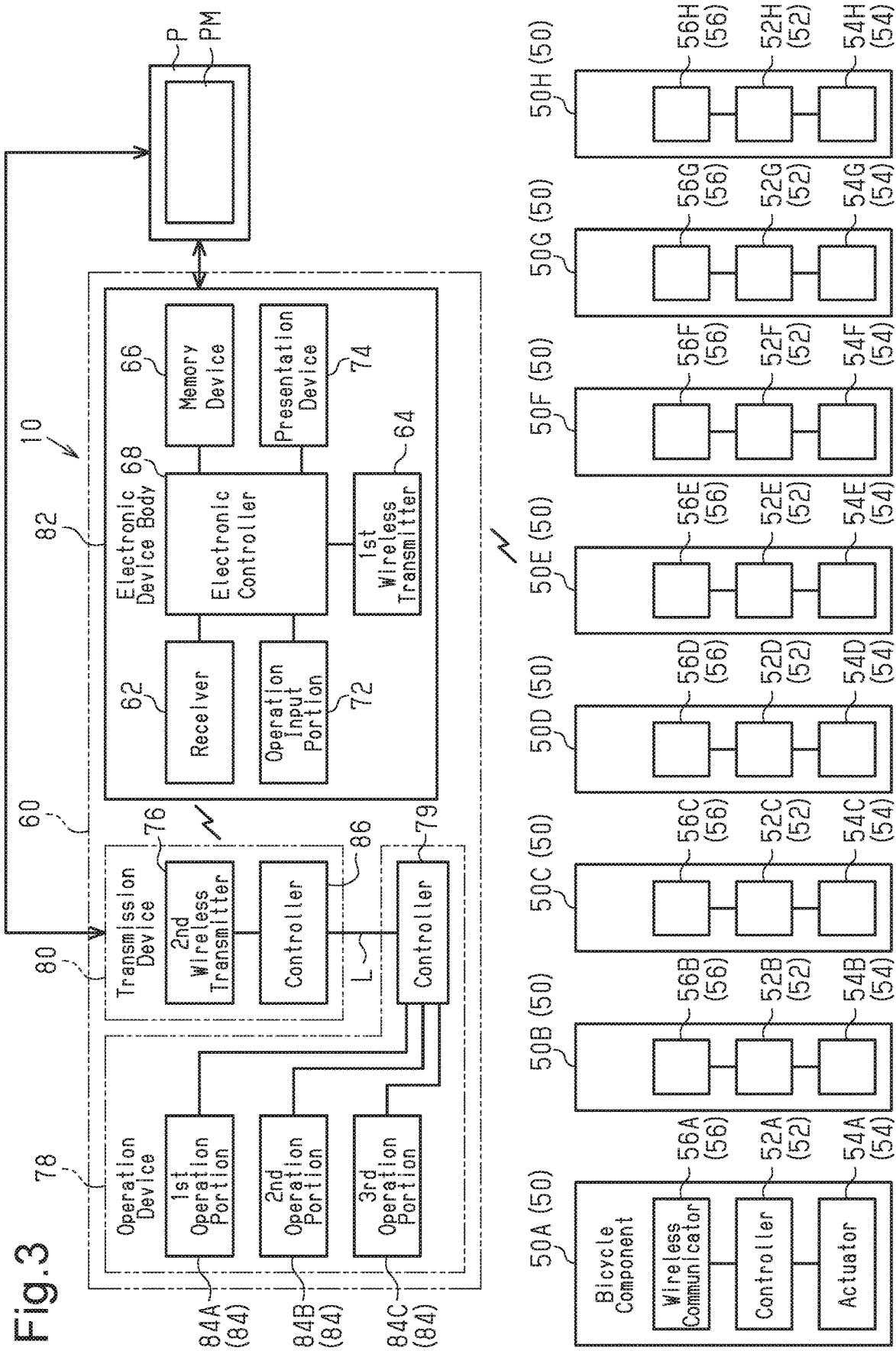
FIG. 3 is a block diagram showing the electric configuration of the electronic device and bicycle components.

The electronic device 60 controls at least one of the bicycle components 50. The at least one of the bicycle components 50 subject to control of the electronic device 60 are selected from the shifting devices 50A and 50B, the brake devices 50C and 50D, the lamp 50E, the adjustable seatpost 50F, the suspension 50G, and the drive unit 50H. As shown in FIG. 3, the bicycle components 50 each include an electronic controller 52, an energy converter 54 and a wireless communicator 56. The electronic controller 52 executes a predetermined program. Herein, the term "electronic controller" can also be abbreviated as just "controller". The electronic controller 52 includes a Central Processing Unit (CPU) or a Micro-Processing Unit (MPU). Preferably, the electronic controller 52 includes one or more processors and one or more storage devices. The memory device stores programs used by the electronic controller 52. The memory device is any computer storage device or any computer readable medium with the sole exception of a transitory, propagating signal. For example, the memory device can be nonvolatile memory and volatile memory, and can includes a ROM (Read Only Memory) device, a RAM (Random Access Memory) device, a hard disk, a flash drive, etc.

The first shifting device 50A and the second shifting device 50B shown in FIG. 1 are configured to change the ratio of the rotation speed of the rear wheel 14 relative to the rotation speed of the crank 28. The first shifting device 50A includes a rear derailleur. The first shifting device 50A is arranged proximate to a rear end of the frame 20. If the rear rotor 34 includes a plurality of rear sprockets 34A, the first shifting device 50A derails the chain 36 onto different rear sprockets 34A. The energy converter 54A of the first shifting device 50A includes an electric actuator or an electric motor. The electronic controller 52A of the first shifting device 50A actuates the energy converter 54A and performs shifting if the wireless communicator 56A receives an actuation command and shifting can be performed. The second shifting device 50B includes a front derailleur. The second shifting device 50B is arranged proximate to the crankshaft 38. If the front rotor 32 includes a plurality of the front sprockets 32A, the second shifting device 50B derails the chain 36 onto different front sprockets 32A. The energy converter 54 of the second shifting device 50B includes an electric actuator or an electric motor. The electronic controller 52B of the second shifting device 50B actuates the energy converter 54B and performs shifting if the wireless communicator 56B receives an actuation command and shifting can be performed.

The front brake device 50C and the rear brake device 50D can be rim brakes, disc brakes, or roller brakes. The front brake device 50C, which is arranged on the front fork 22, stops or slows the rotation of the front wheel 12. The energy converter 54 of the front brake device 50C includes an electric actuator or an electric motor. If the wireless communicator 56C receives an actuation command, the electronic controller 52C of the front brake device 50C actuates the energy converter 54C and moves a brake shoe, a brake pad, or a roller to stop or slow the rotation of the front wheel 12. The rear brake device 50D, which is arranged on the frame 20, stops or slows the rotation of the rear wheel 14. The energy converter 54D of the rear brake device 50D includes an electric actuator or an electric motor. If the wireless communicator 56D receives an actuation command, the electronic controller 52D of the rear brake device 50D actuates the energy converter 54C and moves a brake shoe, a brake pad, or a roller to stop or slow the rotation of the rear wheel 14. At least one of the front brake device 50C and the rear brake device 50D can be actuated by a brake lever 78B of an operation device 78, which will be described later. In this case, the brake lever 78B of the operation device 78 is connected by a wire to at least one of the front brake device 50C and the rear brake device 50D.

The lamp 50E is coupled to the front fork 22 or the handlebar 24. The lamp 50E is configured to be switchable between an activated (ON) state and a deactivated (OFF) state. The energy converter 54E of the lamp 50E includes a light emitting diode (LED) or a light bulb. The electronic controller 52E of the lamp 50E switches the actuation state of the energy converter 54C if the wireless communicator 56E receives an actuation command. The lamp 50E can be configured to be alternately activated and deactivated whenever receiving an actuation command or be activated and deactivated in response to corresponding actuation commands. In addition to being activated and deactivated, the lamp 50E can be configured to be intermittently activated in a predetermined pattern or so that the light intensity is varied in multiple steps. In such cases, the lamp 50E can be configured to change actuation states whenever receiving an actuation command or change actuation states in response to corresponding actuation commands.

The adjustable seatpost 50F is attached to the seatpost 26. The adjustable seatpost 50F lowers and raises the seatpost 26 relative to the frame 20. The energy converter 54F of the adjustable seatpost 50F includes an electric actuator or an electric motor. The adjustable seatpost 50F includes a telescopic electric seatpost that is extended and retracted by the force of an electric motor or a mechanical seatpost that is extended by the force of at least one of a spring and air and retracted manually. The mechanical seat position includes a hydraulic seatpost or a hydraulic and pneumatic seatpost. In the case of an electric seatpost, the electronic controller 52F of the adjustable seatpost 50F actuates the energy converter 54F, if operable, and extends or retracts the seatpost if the wireless communicator 56F receives an actuation command. In the case of an electric seatpost, the raising and lowering of the seatpost are performed by separate actuation commands. In the mechanical seatpost, the energy converter 54F controls a valve that opens and closes a flow path of oil or air. In the case of a mechanical seatpost, the electronic controller 52F of the adjustable seatpost 50F actuates the energy converter 54F and opens the valve if the wireless communicator 56F receives an actuation command. In a state in which the valve is open, the force of at least one of a spring and air acts to extend the adjustable seatpost 50F. In a state in which the valve is closed, the length of the adjustable seatpost 50F does not change. In the case of a mechanical seatpost, the valve can open for a predetermined time if an actuation command is received. Alternatively, if an actuation command is received, the valve can be kept open until the next actuation command is received.

The suspension 50G is arranged on the front fork 22 and attenuates the impact applied to the front wheel 12. The suspension 50G is switchable between a lock state, in which the function of the suspension 50G is restricted with the energy converter 54G, and an unlock state, in which the function of the suspension 50G is not restricted. The suspension 50G can be arranged on the frame 20 and be configured to attenuate the impact applied to the rear wheel 14. The suspension 50G can be any one of a hydraulic suspension, a pneumatic suspension, or a hybrid suspension that uses both hydraulic and pneumatic pressure. The energy converter 54G of the suspension 50G includes an electric actuator or an electric motor. The energy converter 54G controls a valve that opens and closes a flow path of oil or air. The electronic controller 52G of the suspension 50G actuates the energy converter 54G, if actuation is possible, and switches between the lock state and the unlock state if the wireless communicator 56G receives an actuation command. The suspension 50G can be configured to switch between the lock state and the unlock state whenever receiving an actuation command or switch between the lock state and the unlock state in response to corresponding actuation commands. In addition to the lock state and the unlock state, the suspension 50G can be configured to vary the attenuation force in multiple steps. In this case, whenever receiving an actuation command that differs from the actuation commands for switching between the lock state and the unlock state, the attenuation force can be switched one step at a time.

The drive unit 50H assists the propulsion of the bicycle 10. The electronic controller 52H of the drive unit 50H includes a drive circuit that drives the energy converter 54H. The energy converter 54H of the drive unit 50H includes an electric motor. The drive circuit controls the power supplied from the battery 42A to the electric motor. In the present embodiment, the electric motor transmits drive force to a power transmission path of manual drive force extending from the crankshaft 38 to the front rotor 32. In a configuration in which the drive unit 50H does not support the crank 28, the crank 28 is supported by the frame 20. Further, the electric motor of the drive unit 50H is arranged on the frame 20 of the bicycle 10, the rear wheel 14, or the front wheel 12. The electric motor of the drive unit 50H is configured to transmit rotation force to the front wheel 12 or to a transmission path of manual drive force extending from the pedals 30 to the rear wheel 14. Preferably, a power transmission force extending between the electric motor and the crankshaft 38 includes a one-way clutch (not shown) so that the rotation force of the crank 28 does not act on the electric motor in a case in which the crankshaft 38 rotates in a direction in which the bicycle 10 moves forward. The drive unit 50H includes the wireless communicator 56H, the electronic controller 52H, and the energy converter 54H. Additionally, the drive unit 50H includes, for example, a reduction gear that reduces the speed of the rotation generated by the electric motor and a torque sensor that detects the torque applied to the crank 28. The drive unit 50H can further include a rotation detection sensor that detects the rotation of the crank 28. The electronic controller 52H drives the electric motor in accordance with the detection result of the torque sensor. The electronic controller 52H of the drive unit 50H switches the actuation state of the energy converter 54H if the wireless communicator 56H receives an actuation command. The electronic controller 52H can actuate the energy converter 54H in multiple actuation modes having different assist ratios. The drive unit 50H switches actuation modes in accordance with actuation commands. The drive unit 50H can be configured to sequentially switch actuation modes whenever receiving an actuation command or switch actuation modes in accordance with an actuation command that increases the assist ratio and an actuation command that decreases the assist ratio. The actuation mode of the drive unit 50H can include a mode in which the motor does not provide assistance.

Figure 2:
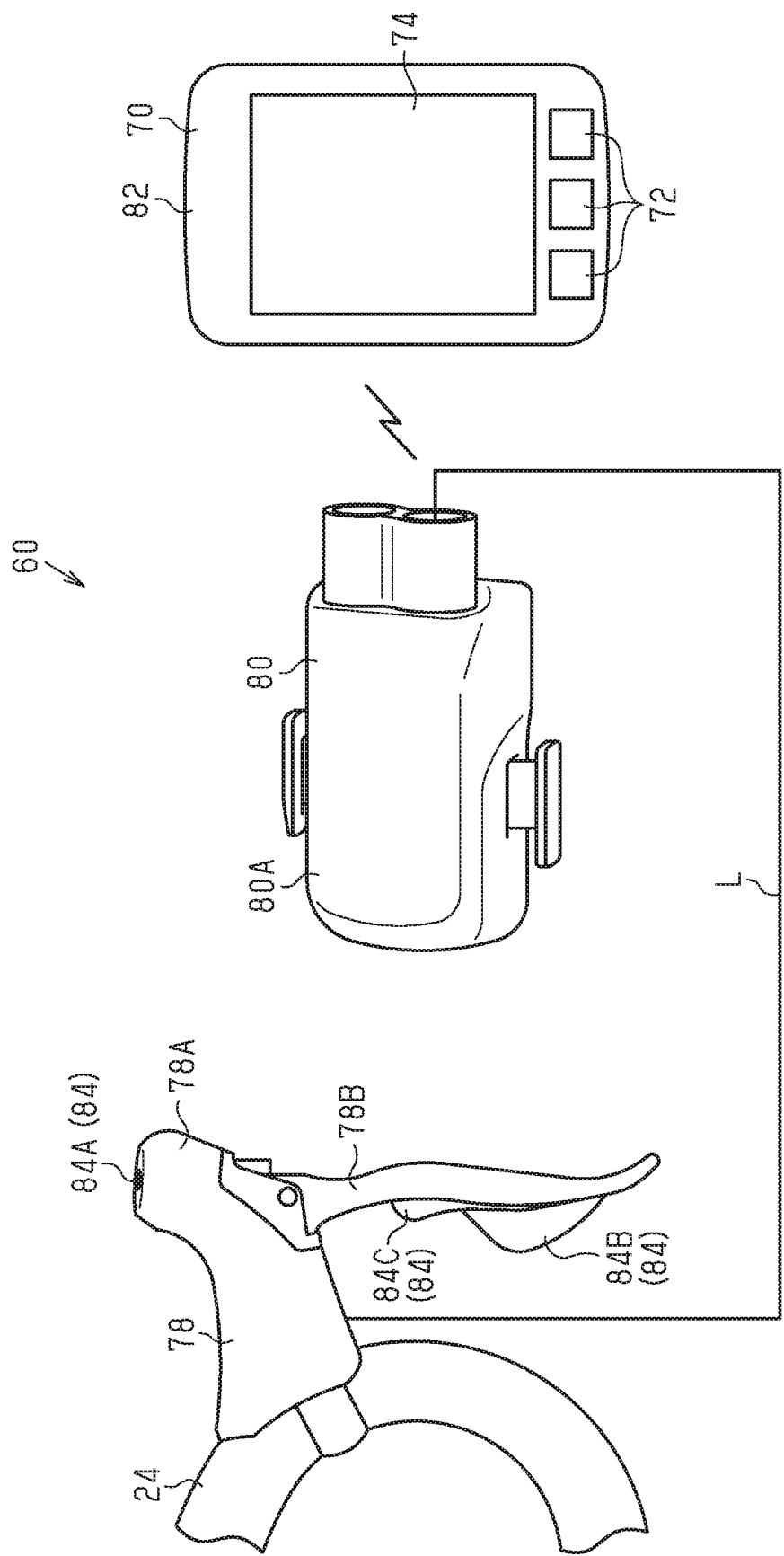
FIG. 2 is a schematic diagram showing the relationship of devices included in the electronic device of FIG. 1.

As shown in FIG. 3, the electronic device 60 includes a receiver 62, a first wireless transmitter 64, a memory device 66 and an electronic controller 68. In one example, the electronic device 60 includes a housing 70 (refer to FIG. 2), an operation input portion 72, a presentation device 74, the second wireless transmitter 76 and the operation device 78. As explained below, a presentation device as used herein refers to a non-human device that conveys (e.g., visually conveys, audibly conveys, haptically conveys) information to a human. As shown in FIG. 2, the electronic device 60 includes the operation device 78, a transmission device 80, and an electronic device body 82. The electronic device 60 controls one or more of the bicycle components 50 (refer to FIG. 1) in accordance with the operation of the operation device 78.

The operation device 78 is coupled to the handlebar 24. The operation device 78 is operable by a user. The operation device 78 includes a plurality of operation portions 84. The operation device 78 includes a base 78A on which the operation portions 84 are arranged. The base 78A is configured to be attachable to and removable from the handlebar 24. The operation device 78 further includes the brake lever 78B that is pivotally coupled to the base 78A. The operation device 78 of FIGS. 1 and 2 includes a road bike brake lever but instead can include a mountain bike brake lever or a city bike brake lever. Further, the operation device 78 does not have to include a brake lever. Moreover, the electronic device 60 can include a plurality of the operation devices 78. The operation devices 78 can be respectively coupled to the left and right ends of the handlebar 24.

The operation portions 84 include a first operation portion 84A, a second operation portion 84B, and a third operation portion 84C. Preferably, the first operation portion 84A is arranged at the top of a free end of the base 78A. Preferably, the second operation portion 84B and the third operation portion 84C are arranged adjacent to the brake lever 78B. The locations of the operation portions 84 are not limited to such positions. There can be only one operation portion 84. Alternatively, there can be three or more operation portions 84. In one example, each operation portion 84 includes a lever or a button. The operation device 78 is electrically connected to the transmission device 80 by a power line L. In the present embodiment, the operation device 78 and the transmission device 80 are configured to perform Power Line Communication (PLC). The operation device 78 and the transmission device 80 each include a communication circuit to perform Power Line Communication. A port is provided on the base 78A. The power line L is connected in an attachable and removable manner to the port.

If the first operation portion 84A is operated in accordance with a first operation method, then the operation device 78 outputs a first operation signal to the transmission device 80. If the first operation portion 84A is operated in accordance with a second operation method, then the operation device 78 outputs a second operation signal to the transmission device 80. If the first operation portion 84A is operated in accordance with a third operation method, then the operation device 78 outputs a third operation signal to the transmission device 80. The first to third operation methods correspond to, for example, one of a short push, a long push, and a double click. A short push corresponds to a single push of the operation portion 84 within a predetermined period. A long push corresponds to pushing of the operation portion 84 for a predetermined period or longer. A double click corresponds to an operation in which the operation portion 84 is pushed twice during a predetermined period. In one example, the first operation portion 84A, the second operation portion 84B, and the third operation portion 84C each include a switch circuit. The operation device 78 further includes an electronic controller 79. The electronic controller 79 includes a detection circuit that detects the voltage output from the switch circuit. The electronic controller 79 executes predetermined programs. The electronic controller 79 includes, for example, a CPU or an MPU. Preferably, the electronic controller 79 includes one or more processors and one or more storage devices. The memory stores programs used by the electronic controller 79. The memory device is any computer storage device or any computer readable medium with the sole exception of a transitory, propagating signal. For example, the memory device can be nonvolatile memory and volatile memory, and can includes a ROM (Read Only Memory) device, a RAM (Random Access Memory) device, a hard disk, a flash drive, etc. For example, if the first operation portion 84A is operated, then the switch circuit of the first operation portion 84A outputs a high-level voltage. If the first operation portion 84A is released, then the switch circuit of the first operation portion 84A outputs a low-level voltage. If the first operation portion 84A is operated, then the electronic controller 79 combines identification information corresponding to the operation device 78 and the first operation portion 84A with type information that is obtained by converting the voltage output from the switch circuit and indicates the type of the operation to generate the first to third operation signals and output the first to third operation signals to the transmission device 80. For example, the duration time of the high-level voltage or the low-level voltage and the number of times the high-level voltage or the low-level voltage has been detected are referred to in order to distinguish the first to third operation methods that the first operation portion 84A has undergone.

If the second operation portion 84B is operated in accordance with a fourth operation, then the operation device 78 outputs a fourth operation signal to the transmission device 80. If the second operation portion 84B is operated in accordance with a fifth operation, then the operation device 78 outputs a fifth operation signal to the transmission device 80. If the second operation portion 84B is operated in accordance with a sixth operation method, then the operation device 78 outputs a sixth operation signal to the transmission device 80. The fourth to sixth operation methods correspond to, for example, one of a short push, a long push, and a double click. For example, if the second operation portion 84B is operated, then the switch circuit of the second operation portion 84B outputs a high-level voltage. If the second operation portion 84B is released, then the switch circuit of the second operation portion 84B outputs a low-level voltage. If the second operation portion 84B is operated, then the electronic controller 79 combines identification information corresponding to the operation device 78 and the second operation portion 84B with type information output from the switch circuit to generate the fourth to sixth operation signals and output the fourth to sixth operation signals to the transmission device 80.

If the third operation portion 84C is operated in accordance with a seventh operation method, then the operation device 78 outputs a seventh operation signal to the transmission device 80. If the third operation portion 84C is operated in accordance with an eighth operation method, then the operation device 78 outputs an eighth operation signal to the transmission device 80. If the third operation portion 84C is operated in accordance with a ninth operation method, then the operation device 78 outputs a ninth operation signal to the transmission device 80. The seventh to ninth operation methods correspond to, for example, one of a short push, a long push, and a double click. For example, if the third operation portion 84C is operated, then the switch circuit of the third operation portion 84C outputs a high-level voltage. If the third operation portion 84C is released, then the switch circuit of the third operation portion 84C outputs a low-level voltage. If the third operation portion 84C is operated, then the electronic controller 79 combines identification information corresponding to the operation device 78 and the third operation portion 84C with type information output from the switch circuit to generate the seventh to ninth operation signals and output the seventh to ninth operation signals to the transmission device 80.

The transmission device 80 shown in FIG. 2 is configured to be coupled to the frame 20. The transmission device 80 is coupled to, for example, a chain stay or seat stay of the frame 20. As shown in FIG. 3, the transmission device 80 includes the second wireless transmitter 76 and an electronic controller 86. The electronic controller 86 executes a predetermined program. The electronic controller 86 includes, for example, a CPU or an MPU. Preferably, the electronic controller 86 includes one or more processors and one or more storage devices. The memory that stores programs used by the electronic controller 86. The memory device is any computer storage device or any computer readable medium with the sole exception of a transitory, propagating signal. For example, the memory device can be nonvolatile memory and volatile memory, and can includes a ROM (Read Only Memory) device, a RAM (Random Access Memory) device, a hard disk, a flash drive, etc. The transmission device 80 includes a case 80A. The second wireless transmitter 76 and the electronic controller 86 are accommodated in the case 80A. The case 80A includes a port. The power line L is connected in an attachable and removable manner to the case 80A. The transmission device 80 is supplied with power from the battery unit 42.

The operation device 78 and the second wireless transmitter 76 are connected by an electric wire. More specifically, the power line L connects the electronic controller 79 of the operation device 78 and the electronic controller 86. A conductive wire connects the electronic controller 86 and the second wireless transmitter 76.

If an operation signal is input, then the electronic controller 86 generates operation information corresponding to the operation signal. The second wireless transmitter 76 transmits the operation information to the receiver 62 through wireless communication. The operation information includes information included in the operation signal, that is, the identification information of the operation device 78 and the operation portion 84 and the type information indicating the operation method of the operation portion 84. The identification information includes information that allows the electronic controller 86 and the user to identify the operation device 78 and the operation portions 84 such as the name or product number of the operation device 78 and the operation portions 84. The transmission device 80 is set so that whether or not operation information is transmitted depends on the operation signal. The electronic controller 86 includes a setting memory. The setting memory includes a non-volatile memory. The electronic controller 86 generates operation information if the information included in the input operation signal is stored in the setting memory and transmits the operation information to the second wireless transmitter 76 through wireless communication. In the present embodiment, the setting memory stores the identification information of the operation device 78 and the operation portions 84. When there is only one operation portion 84, the setting memory can store only the identification information of the operation device. When there is only one operation device 78, the setting memory can store only the identification information of the operation portions 84.

Table 1 indicates setting information stored in the setting memory. For example, the setting memory can store four pieces of setting information. In table 1, as setting number 1, for example, the setting memory stores the identification information of the first operation portion 84A of the operation device 78 shown in FIG. 2. As setting number 2, for example, the setting memory stores the identification information of the second operation portion 84B of the operation device 78 shown in FIG. 2. Setting numbers 3 and 4 has no settings. The number of settings that can be stored can be changed in accordance with the capacity of the setting memory. For example, the setting memory can be configured to store only one piece of setting information. Alternatively, the setting memory can be configured to store four or more pieces of setting information.

TABLE 1

| Setting No. | Identification Information of Operation Device and Operation Portions |
|---|---|
| 1 | 1st Operation Portion of Operation Device |
| 2 | 2nd Operation Portion of Operation Device |

TABLE 1-continued

| Setting No. | Identification Information of Operation Device and Operation Portions |
|---|---|
| 3 | No Setting |
| 4 | No Setting |

The operation performed by the electronic controller 86 of the transmission device 80 will now be described with reference to FIG. 4. The electronic controller 86 executes the present process in predetermined cycles as long as the transmission device 80 is powered. In step S11, the electronic controller 86 determines whether or not an operation signal has been obtained. If the electronic controller 86 determines in step S11 that an operation signal has been obtained, then the electronic controller 86 proceeds to step S12. The electronic controller 86 repeats step S11 until an operation signal is obtained. In step S12, the electronic controller 86 determines whether or not the identification signal included in the obtained operation signal matches the identification information stored in the setting memory. If the electronic controller 86 determines in step S12 that the identification signal included in the obtained operation signal matches the identification information stored in the setting memory, then the electronic controller 86 proceeds to step S13. If the electronic controller 86 determines in step S12 that the identification signal included in the obtained operation signal does not match the identification information stored in the setting memory, then the electronic controller 86 proceeds to step S11 after a predetermined cycle. In step S13, the electronic controller 86 generates operation information corresponding to the operation signal and proceeds to step S14. In step S14, the electronic controller 86 transmits the generated operation information from the second wireless transmitter 76 through wireless communication and proceeds to step S11 after a predetermined cycle. When the supply of power is stopped, the electronic controller 86 ends the processing.

The setting information stored in the setting memory can be changed using an external device P. The external device P includes, for example, one of a personal computer and a portable terminal such as a personal computer and a smartphone. The external device P and the transmission device 80 can be wire-connected by the power line L, which is connected in an attachable and removable manner to the port of the case 80A. Alternatively, the external device P and the transmission device 80 can be wireless-connected by the second wireless transmitter 76. The second wireless transmitter 76 can be configured as a wireless communication unit that receives information through wireless communication in addition to transmitting information through wireless communication.

The transmission device 80 transmits first operation information to transmit operation information corresponding to the first operation signal. The transmission device 80 transmits second operation information to transmit operation information corresponding to the second operation signal. The transmission device 80 transmits third operation information to transmit operation information corresponding to the third operation signal. The transmission device 80 transmits fourth operation information to transmit operation information corresponding to the fourth operation signal. The transmission device 80 transmits fifth operation information to transmit operation information corresponding to the fifth operation signal. The transmission device 80 transmits sixth operation information to transmit operation information corresponding to the sixth operation signal. The transmission device 80 transmits seventh operation information to transmit operation information corresponding to the seventh operation signal. The transmission device 80 transmits eighth operation information to transmit operation information corresponding to the eighth operation signal. The transmission device 80 transmits ninth operation information to transmit operation information corresponding to the ninth operation signal.

Preferably, as shown in FIG. 1, the electronic device body 82 is attached to the handlebar 24. As shown in FIG. 3, the electronic device body 82 includes the receiver 62, the first wireless transmitter 64, the memory device 66, the electronic controller 68, the housing 70 (refer to FIG. 2), the operation input portion 72 and the presentation device 74. The receiver 62, the first wireless transmitter 64, the memory device 66 and the electronic controller 68 are separate from the operation device 78. The receiver 62, the first wireless transmitter 64, the memory device 66, the electronic controller 68, the operation input portion 72 and the presentation device 74 are provided on the housing 70. The receiver 62, the first wireless transmitter 64, the memory device 66 and the electronic controller 68 are accommodated inside the housing 70 shown in FIG. 2. The operation input portion 72 and the presentation device 74 are provided on the housing 70 so as to be partially exposed to the outside of the housing 70. The electronic device body 82 includes a battery (not shown) and is not supplied with power from the battery unit 42. The electronic device body 82 can be configured by, for example, a cycle computer or a smartphone.

The receiver 62 shown in FIG. 3 receives operation information that corresponds to the operation of the operation device 78. The receiver 62 receives operation information that differs between the operation portions 84 that are operated. Further, the receiver 62 receives operation information that differs between the operation methods of the operation device 78. The receiver 62 receives the operation information through wireless communication. More specifically, the receiver 62 is configured to be able to receive operation information transmitted through wireless communication by the second wireless transmitter 76. If the receiver 62 receives operation information, the receiver 62 outputs the received operation information to the electronic controller 68. One example of the standard of the wireless communication performed by the second wireless transmitter 76 and the receiver 62 is ANT+ (registered trademark) or BLUETOOTH (registered trademark).

Preferably, the transmission device 80 and the electronic device body 82 are wireless-connected through pairing. As the transmission device 80 and the electronic device body 82 undergo pairing, the transmission device 80 transmits the identification information of the operation device 78 and the operation portions 84 stored in the setting memory and the type information corresponding to each piece of identification information of the operation portion 84 to the electronic device body 82.

The memory device 66 stores various types of control programs and information used for various types of control processes. The memory device 66 includes, for example, a non-volatile memory and a volatile memory and can includes a ROM (Read Only Memory) device, a RAM (Random Access Memory) device, a hard disk, a flash drive, etc. The memory device 66 is any computer storage device or any computer readable medium with the sole exception of a transitory, propagating signal. As the electronic device body 82 undergoes pairing with the transmission device 80, the electronic device body 82 stores the identification information and type information transmitted from the transmission device 80 in the memory device 66. This allows the electronic device body 82 to acknowledge the combination of the identification information and the type information that can be received from the transmission device 80. Table 2 shows one example of the information stored in the memory device 66 through pairing. For example, if the transmission device 80, which is connected to the operation device 78 shown in FIG. 2, is paired with the electronic device body 82, then the combinations of the identification information of the operation device 78 and the operation portions 84 shown in FIG. 2 and the operation methods that can be performed on the operation portions 84 are stored in the memory device 66.

TABLE 2

| Identification Information of Operation Device and Operation Portions | Operation Type |
|---|---|
| 1st Operation Portion of Operation Device | 1st Operation Method, 2nd Operation Method, 3rd Operation Method |
| 2nd Operation Portion of Operation Device | 1st Operation Method, 2nd Operation Method, 3rd Operation Method |

The memory device 66 stores actuation commands, which are sent to the bicycle components 50, in correspondence with the operation information. The receiver 62 can receive multiple types of operation information. The memory device 66 stores actuation commands corresponding to the operation information. The actuation commands include identification information of the bicycle components 50 and information related to the actuation of the bicycle components 50.

Table 3 shows one example of actuation commands A to L that can be stored in the memory device 66. The bicycle component 50 that receives an actuation command including its identification information is actuated in accordance with the actuation command. If the bicycle component 50 is configured to be actuated in multiple steps, then the bicycle component 50 that receives the actuation command performs an actuation action one step at a time. If the bicycle component 50 cannot be actuated in accordance with the actuation command, then the bicycle component 50 is not actuated. If the drive unit 50H receives actuation command K in an assist OFF state, then the drive unit 50H starts assistance. If the drive unit 50H receives actuation command L in a state in which assistance is the weakest, then the drive unit 50H stops assistance. The transmission device 80 transmits actuation commands E and F in predetermined intervals during periods in which the front brake device 50C and the rear brake device 50D are operated, respectively. With regard to actuation commands E and F, if the brake devices 50C and 50D respectively receive actuation commands E and F, then the brake devices 50C and 50D continue to perform braking for a predetermined period from when the operation signal is received. If the lamp 50E receives actuation command G in an activated state, then the lamp 50E is switched OFF. If the lamp 50E receives actuation command G in a deactivated state, then the lamp 50E is switched ON. If the suspension 50G receives actuation command J in a locked state, then the suspension 50G switches to an unlocked state. If the suspension 50G receives actuation command J in an unlocked state, then the suspension 50G switches to a locked state. The actuation command corresponding to each bicycle component 50 can be added to the memory device 66 by pairing the electronic device 60 and the bicycle component 50.

TABLE 3

| Actuation command | Information Include in Actuation command | |
|---|---|---|
| | Identification Information | Operation |
| A | 1st Shifting Device | Shift-Up |
| B | 1st Shifting Device | Shift-Down |
| C | 2nd Shifting Device | Shift-Up |
| D | 2nd Shifting Device | Shift-Down |
| E | Front Brake Device | ON |
| F | Rear Brake Device | ON |
| G | Lamp | ON/OFF |
| H | Adjustable Seatpost | Seatpost Up |
| I | Adjustable Seatpost | Seatpost Down |
| J | Suspension | Lock/Unlock |
| K | Drive Unit | Assist-Up |
| L | Drive Unit | Assist-Down |

The memory device 66 is configured to be able to change the actuation commands stored in correspondence with operation information. Table 4 is stored in the memory device 66 and shows the corresponding relationship of the operation information and the actuation commands.

TABLE 4

| Operation Information | Actuation command |
|---|---|
| No Setting | A |
| No Setting | B |
| No Setting | C |
| No Setting | D |
| No Setting | E |
| No Setting | F |
| 1st Operation Information | G |
| No Setting | H |
| No Setting | I |
| 2nd Operation Information | J |
| No Setting | K |
| No Setting | L |

To change an actuation command that is stored in correspondence with operation information, the memory device 66 is configured to allow an actuation command to be changed in order to control a bicycle component 50 of a type that differs from the bicycle component 50 controlled in accordance with an actuation command prior to the change. For example, actuation command G corresponding to the first operation information in table 4 is changed to actuation command H to change the bicycle component 50 that is changed when receiving the first operation from the lamp 50E to the suspension 50G. The memory device 66 is configured to allow an actuation command, which corresponds to operation information, to be changed in accordance with information input from the external device P. The external device P and the electronic device body 82 are configured to be connectable through the receiver 62, the first wireless transmitter 64, or a cable. The receiver 62 can be configured as a wireless communication unit that transmits information through wireless communication in addition to receiving information through wireless communication. If the electronic device body 82 and the external device P are connected by a cable, then the electronic device body 82 further includes an external connection terminal such as a USB port.

The electronic controller 68 includes an arithmetic processing device that performs a predetermined control program. The arithmetic processing device includes, for example, a CPU or an MPU. The electronic controller 68 can include one or more arithmetic processing devices. If the receiver 62 receives operation information, then the electronic controller 68 transmits an actuation command that corresponds to the received operation information from the first wireless transmitter 64.

Figure 5:
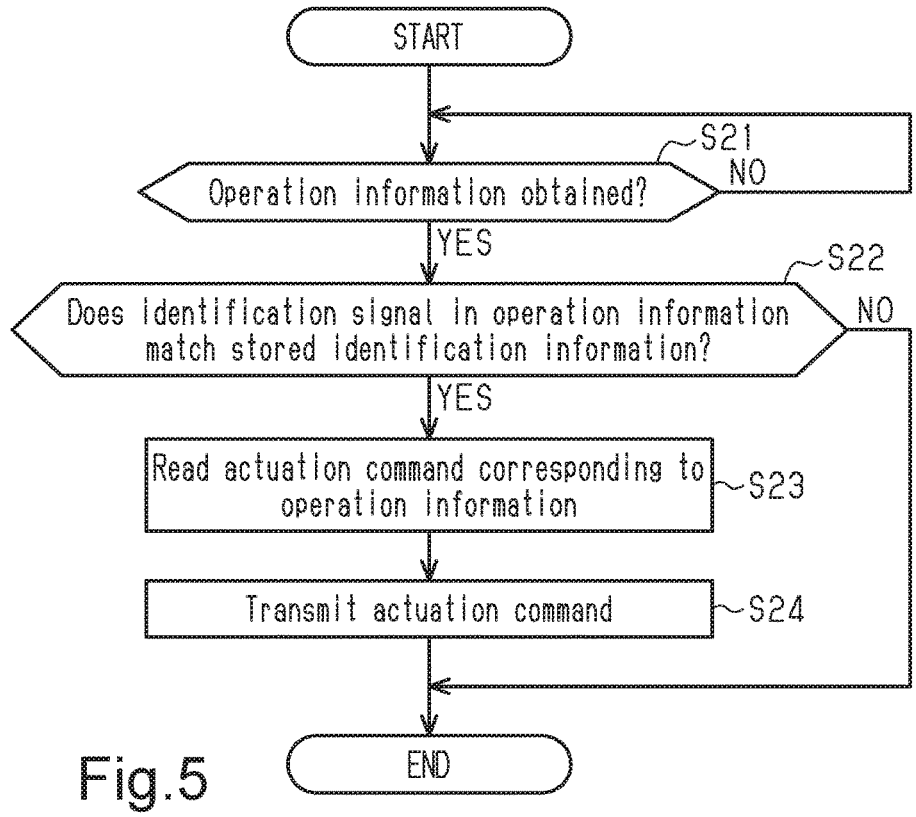
FIG. 5 is a flowchart showing the processing executed by an electronic controller of an electronic device body of FIG. 3.

The operation performed by the electronic controller 68 of the electronic device body 82 will now be described with reference to FIG. 5. The electronic controller 68 executes this process in predetermined cycles as long as the electronic device body 82 is supplied with power. If the power supply of the electronic device body 82 goes ON, in step S21, then the electronic controller 68 determines whether or not operation information has been obtained. The power supply of the electronic device body 82 can be configured to be switchable between ON and OFF by a switch provided on the electronic device body 82. If the electronic controller 68 determines in step S21 that operation information has been obtained, then the electronic controller 68 proceeds to step S22. The electronic controller 68 repeats step S21 until determining that operation information has been obtained. In step S22, the electronic controller 68 determines whether or not the identification information included in the obtained operation information matches the identification information stored in the memory device 66. If the electronic controller 68 determines in step S22 that the identification information included in the obtained operation information matches the identification information stored in the memory device 66, then the electronic controller 68 proceeds to step S23. If the electronic controller 68 determines in step S22 that the identification information included in the obtained operation information does not match the identification information stored in the memory device 66, then the electronic controller 68 proceeds to step S21 after a predetermined cycle. In step S23, the electronic controller 68 reads the actuation command corresponding to the operation information from the memory device 66 and proceeds to step S24. In step S24, the electronic controller 68 transmits the read actuation command from the first wireless transmitter 64 through wireless communication and then proceeds to step S21 after a predetermined cycle. If the supply of power is cut, then the electronic controller 68 ends the processing.

The electronic controller 68 is configured to be able to change an actuation command, which is stored in correspondence with operation information in the memory device 66, in accordance with the operation of the operation input portion 72. One example of the standard of the wireless communication performed by the first wireless transmitter 64 and the wireless communicator 56 of each bicycle component 50 is ANT+ (registered trademark) or BLUETOOTH (registered trademark).

The operation input portion 72 is operable by the user. In one example, the operation input portion 72 is a button. The presentation device 74 is configured to present various types of information related to the bicycle 10. Various types of information related to the bicycle 10 includes information related to vehicle speed, information related to cadence, information related to heart rate, information related to travel distance, and the like. The operation input portion 72 is operated to change the information presented on the presentation device 74 with the electronic controller 68. The presentation device 74 is configured to present the information of the bicycle components 50 that are controlled in accordance with the operation of the operation device 78. The presentation device 74 includes at least one of a display panel and a speaker. The display panel includes, for example, a liquid crystal display panel or an organic electroluminescence (EL) display panel.

Figure 6:
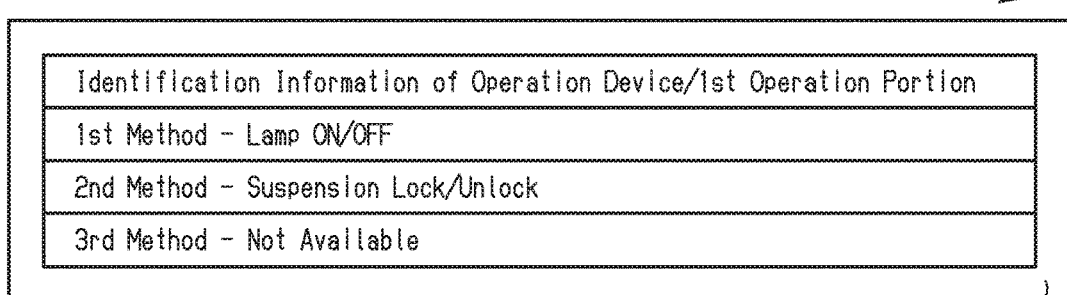
FIG. 6 is a plan view showing one example of the contents of actuation commands shown on a presentation device.
Figure 7:
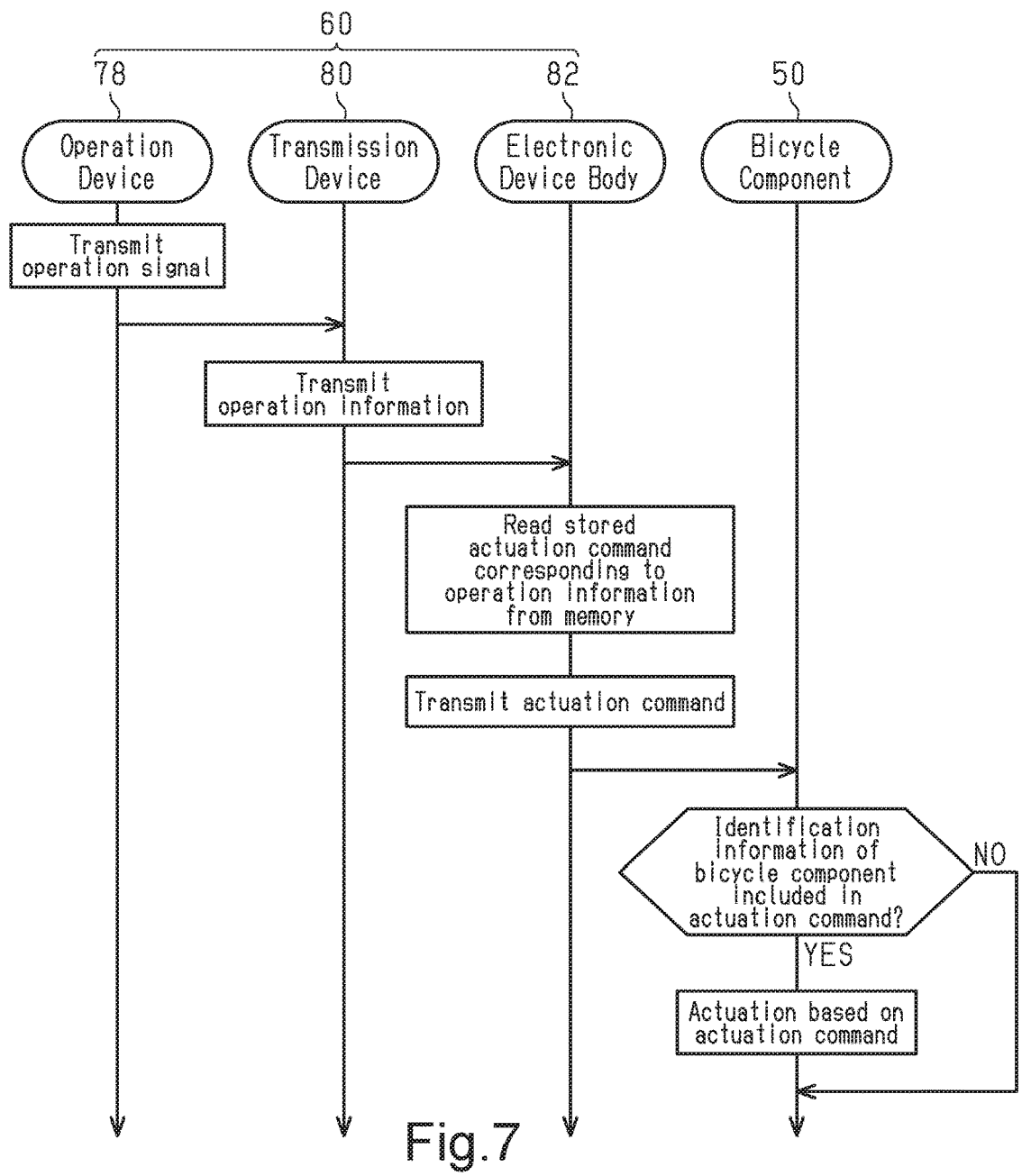
FIG. 7 is a sequence diagram showing the order in which bicycle components are executed by the electronic device of FIG. 3.

FIG. 6 shows one example of the information presented by the presentation device 74. The presentation device 74 shows a list of identification information related to the operation device 78 (name, product number, etc.), information related to the first operation portion 84A (name), type information indicating the type of operation method, identification information related to the bicycle components 50 (name, product number, etc.), and actuation actions of the bicycle components 50. Preferably, the identification information presented by the presentation device 74 is text information that can be intuitively acknowledged by the user. The information shown in FIG. 6 can be displayed on the presentation device 74 by performing a predetermined operation on the operation input portion 72. The display of the information shown in FIG. 6 on the presentation device 74 allows the user to acknowledge how to operate an operation portion 84 of the operation device 78 in order to actuate a bicycle component 50 in a certain manner. In the example shown in FIG. 6, the user can acknowledge that the lamp 50E can be activated or deactivated if the first operation portion 84A of the operation device 78 shown in FIG. 2 is operated in accordance with the first operation method. The user can also acknowledge that the suspension 50G can be switched between a lock state and an unlock state if the first operation portion 84A is operated in accordance with the second operation method. Further, the user can acknowledge that none of the bicycle components 50 are actuated if the first operation portion 84A is operated in accordance with the third operation method.

A method for controlling the electronic device 60 includes a first step, a second step, and a third step. The first step includes receiving operation information that corresponds to the operation of the operation device 78. The second step includes, when receiving operation information, transmitting an actuation command stored in correspondence with the received operation information through wireless communication. The third step includes changing an actuation command stored in correspondence with operation information. In one example, the first step is executed by the receiver 62, the second step is executed by the electronic controller 68, and the third step is executed by the electronic controller 68 or the external device P.

The process from the operation of the operation device 78 to the actuation of the bicycle components 50 will now be described. In accordance with the operation portion 84 that is operated and the operation content input to the operation portion 84, the operation device 78 transmits an operation signal to the transmission device 80. The transmission device 80 that receives the operation signal generates operation information corresponding to the operation signal and transmits the operation information to the electronic device body 82 through wireless communication. The electronic controller 68 of the electronic device body 82 that receives the operation information reads the actuation command corresponding to the operation information from the memory device 66 and transmits the actuation command to the bicycle components 50. Upon receipt of the actuation command, each bicycle component 50 determines whether or not the received actuation command includes its identification information. If the received actuation command does not include its identification information, then the bicycle component 50 is not actuated. If the received actuation command includes its identification information, then the bicycle component 50 is actuated in accordance with the actuation command.

The electronic controller 68 is operated in a normal mode and a setting changing mode. A predetermined operation is performed on the operation input portion 72 to shift from the normal mode to the setting changing mode. In the normal mode, the electronic controller 68 shows at least one of the various types of information of the bicycle 10 and transmits the actuation command corresponding to the received operation information from the first wireless transmitter 64. In the setting changing mode, the electronic controller 68 is able to change actuation commands that are stored in the memory device 66 in correspondence with operation information.

Figure 8:
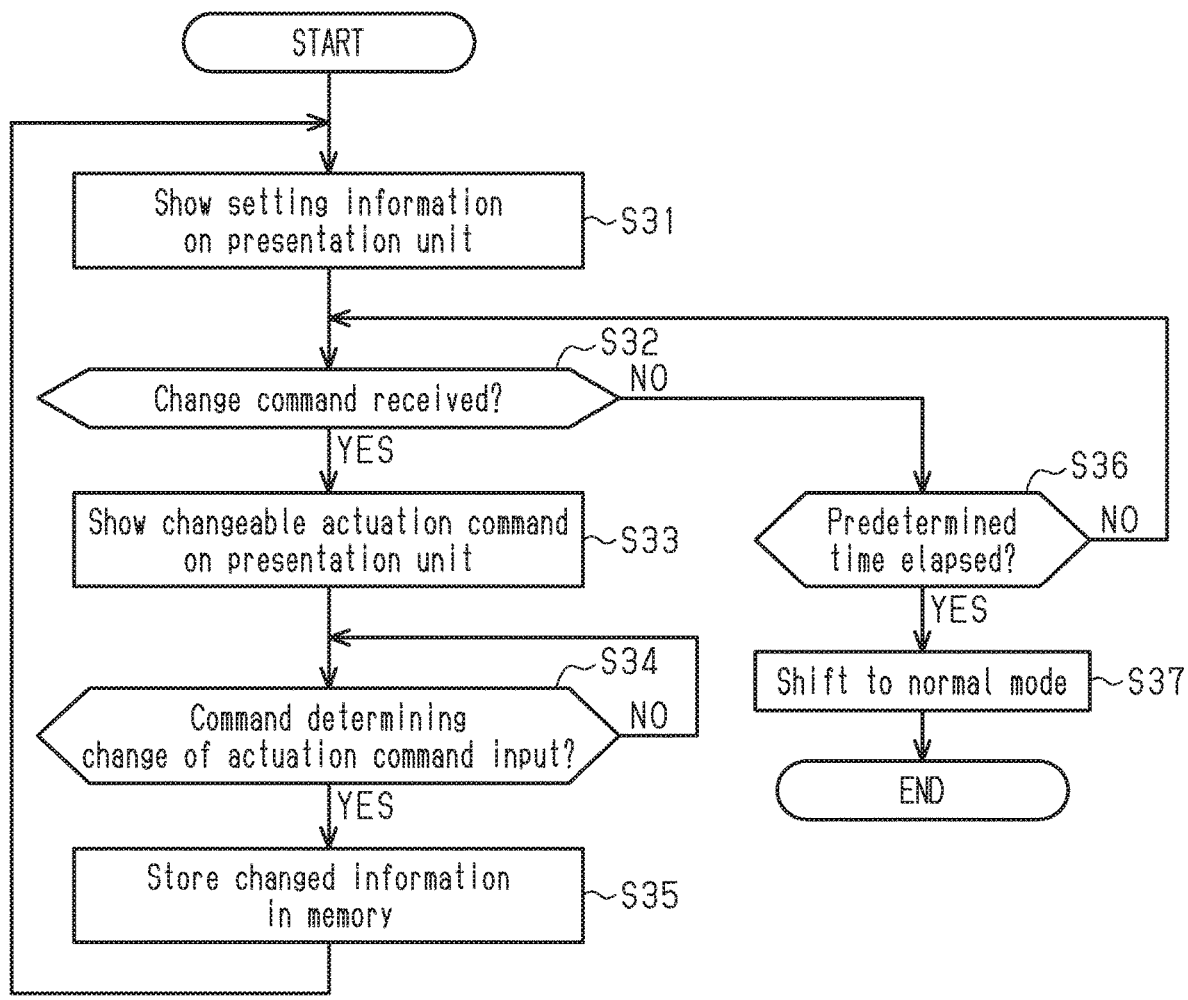
FIG. 8 is a flowchart showing a process for changing actuation commands of the electronic controller of the electronic device body of FIG. 3.

The process executed by the electronic controller 68 to change an actuation command that is stored in the memory device 66 in correspondence with operation information will now be described with reference to FIG. 8. The electronic controller 68 executes the process shown in FIG. 8 as long as the electronic controller 68 remains in the setting changing mode. The electronic controller 68 can end the setting changing mode if a predetermined operation is performed on the operation input portion 72 even while executing the process of FIG. 8.

If the electronic controller 68 enters the setting changing mode, in step S31, then the electronic controller 68 shows the present setting information on the presentation device 74 like in FIG. 6. The electronic controller 68 then proceeds to step S32. In step S32, the electronic controller 68 determines whether or not a change command has been received from the operation input portion 72. The electronic controller 68 determines that a change command has been received from the operation input portion 72 if, for example, the user uses the operation input portion 72 to indicate the setting that the user wishes to change with a cursor and then operates the operation input portion 72. If the electronic controller 68 determines in step S32 that a change command has been received, then the electronic controller 68 proceeds to step S33.

In step S33, the electronic controller 68 shows the changeable actuation commands on the presentation device 74 and then proceeds to step S34. For example, the electronic controller 68 shows the changeable actuation commands on the presentation device 74 in a manner allowing the changeable actuation commands to be pulled down for selection. The actuation commands include the identification information and actuation information of the bicycle components 50.

In step S34, the electronic controller 68 selects the actuation command that corresponds to the operation of the operation input portion 72 and determines whether or not a command determining the change has been input. If the electronic controller 68 determines that a command determining the change has been input, then the electronic controller 68 proceeds to step S35 and stores the changed information in the memory device 66. When step S35 ends, the electronic controller 68 proceeds to step S31 after a predetermined cycle.

If the electronic controller 68 determines in step S32 that there is no change command, then the electronic controller 68 proceeds to step S36. In step S36, the electronic controller 68 determines whether or not a predetermined period has elapsed. If the predetermined has not elapsed, then the electronic controller 68 proceeds to step S32. If the electronic controller 68 determines that the predetermined period has elapsed in step S36, then the electronic controller 68 proceeds to step S37. In step S37, the electronic controller 68 shifts to the normal mode and ends the process.

Second Embodiment

A second embodiment will now be described with reference to FIG. 9. In an electronic device 60A of the second embodiment, same reference numerals are given to those components that are the same as the corresponding components of the electronic device 60 of the first embodiment. The description will focus on parts differing from the electronic device 60 of the first embodiment.

Figure 9:
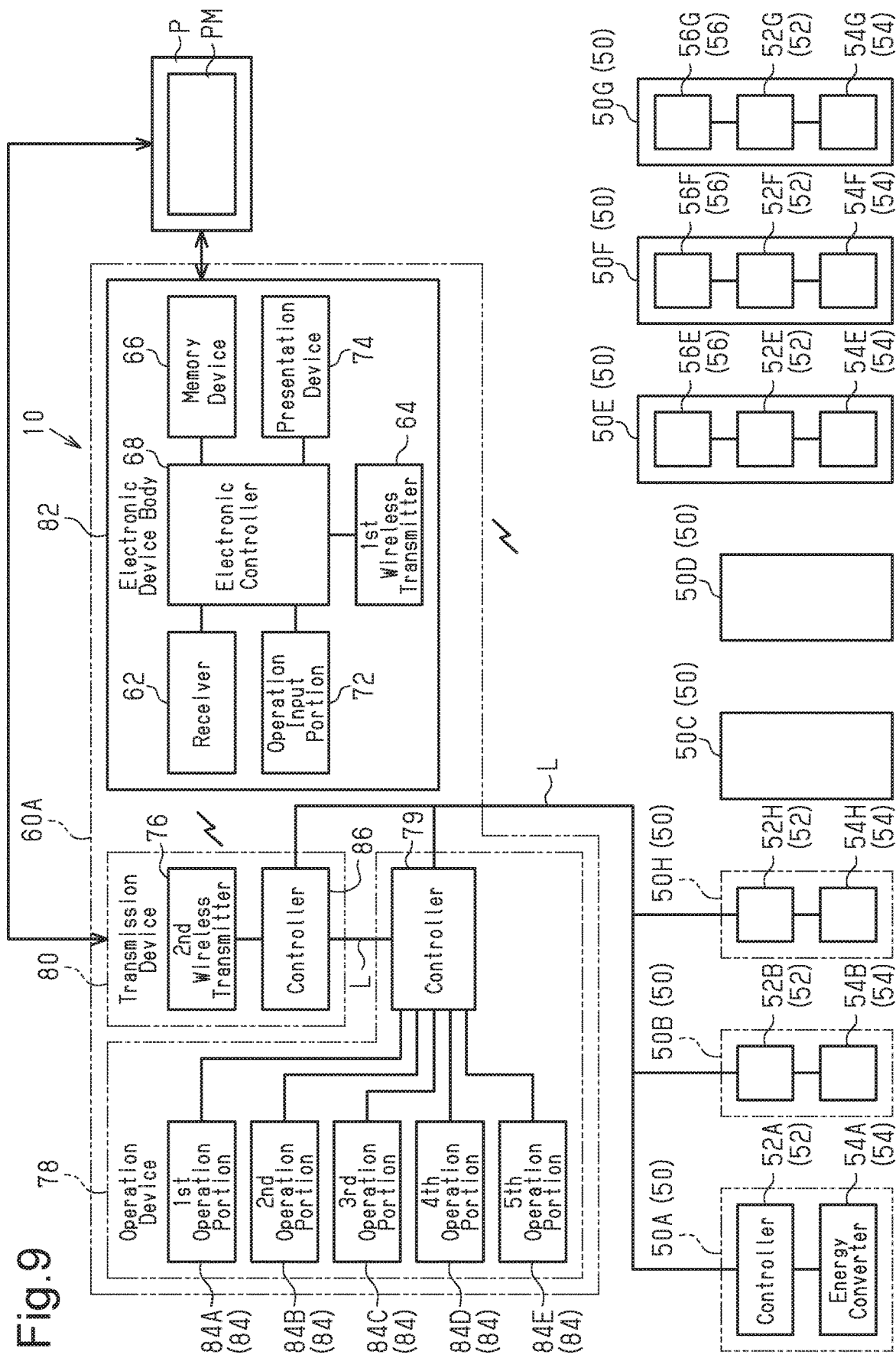
FIG. 9 is a block diagram showing the electric configuration of a second embodiment of an electronic device and bicycle components.

As shown in FIG. 9, the operation device 78 of the electronic device 60A is connected to the first and second shifting devices 50A and 50B by the power line L. Each of the first and second shifting devices 50A and 50B does not include the wireless communicator 56 and includes a connection port that is connectable to the power line L. The operation device 78, the transmission device 80, the first and second shifting devices 50A and 50B and the drive unit 50H are configured to perform power line communication. The brake devices 50C and 50D include mechanical brake devices that are driven only by wires.

The setting information stored in the setting memory of the electronic controller 86 further includes actuation commands and information of the first and second shifting devices 50A and 50B and the drive unit 50H that are actuated in accordance with the operation of the operation portions 84 of the operation device 78. The setting information is shared by the first and second shifting devices 50A and 50B and the drive unit 50H. Upon receipt of operation signals that are stored in the setting information, the first and second shifting devices 50A and 50B and the drive unit 50H are actuated in accordance with the actuation command stored in the setting information. The setting memory does not have to be provided on the electronic controller 86 and can be separate from the transmission device 80. As long as the setting memory can be referred to by the electronic controller 86, the setting memory can be provided on any of the operation device 78, the first and second shifting devices 50A and 50B, the drive unit 50H, and the battery unit 42. Further, the setting memory can be arranged separately from the operation device 78, the first and second shifting devices 50A and 50B, the drive unit 50H, and the battery unit 42. Table 5 is a chart showing an example of the setting information stored in the setting memory. For example, the setting memory can store four pieces of setting information in correspondence with the transmission device 80. The setting memory can store, for example, the identification information of the transmission device 80 in correspondence with the four operation portions 84. In the example shown in table 5, the identification information of the transmission device 80 and setting number 1 are stored in correspondence with the identification information of the first operation portion 84A of the operation device 78. The setting number does not have to be stored. However, if the number that can be set is determined, it is preferred that the number be stored so that it can be displayed. The identification information of the transmission device 80 can also be stored in correspondence with the three operation portions 84. However, such identification information is not set in the example of table 5. The number of pieces of setting information stored in correspondence with the transmission device 80 can be changed in accordance with the capacity of the setting memory.

The operation device 78 includes a shifter that actuates the shifting devices 50A and 50B. The operation device 78 further includes a fourth operation portion 84D and a fifth operation portion 84E. The fourth operation portion 84D and the fifth operation portion 84E can be arranged on the base 78A or on a base that is separate from the base 78A. The fourth operation portion 84D and the fifth operation portion 84E are configured in the same manner as the first operation portion 84A, second operation portion 84B, and the third operation portion 84C. If the fourth operation portion 84D is operated, then the electronic controller 79 combines the identification information corresponding to the operation device 78 and the fourth operation portion 84D with type information converted from the voltage output from a switch circuit indicating the type of operation to generate a tenth operation signal. The electronic controller 79 then outputs the tenth operation signal to the transmission device 80. If the fifth operation portion 84E is operated, the electronic controller 79 combines identification information corresponding to the operation device 78 and the fifth operation portion 84E with type information converted from the voltage output from a switch circuit indicating the type of operation to generate an eleventh operation signal. The electronic controller 79 then outputs the eleventh operation signal to the transmission device 80.

TABLE 5

| Identification Information of Operation Device and Operation Portion | Actuation Subject and Actuation Command |
|---|---|
| 1st Operation Portion of Operation Device | Transmission Device Setting No. 1 |
| No Setting | Transmission Device Setting No. 2 |
| No Setting | Transmission Device Setting No. 3 |
| No Setting | Transmission Device Setting No. 4 |
| 2nd Operation Portion of Operation Device | 1st Shifting Device Shift-Up |
| 3rd Operation Portion of Operation Device | 2nd Shifting Device Shift-Down |
| 4th Operation Portion of Operation Device | Drive Unit Assist-Up |
| 5th Operation Portion of Operation Device | Drive Unit Assist-Down |

Figure 4:
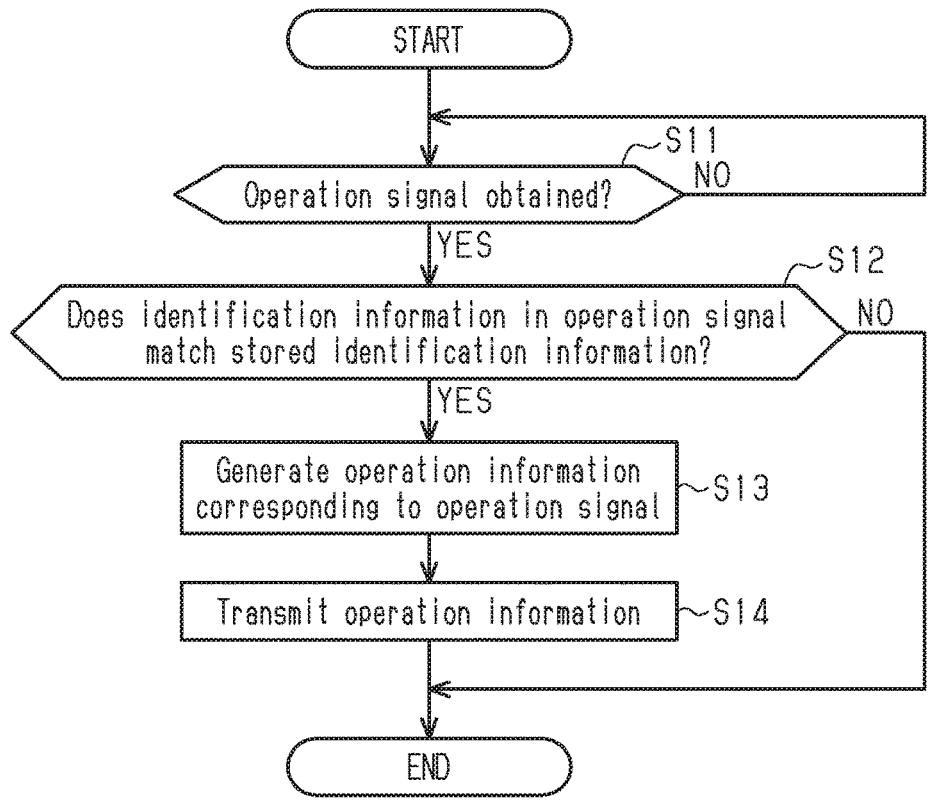
FIG. 4 is a flowchart showing the processing executed by an electronic controller of a transmission device of FIG. 3.

The process executed by the electronic controller 86 of the transmission device 80 is similar to the flowchart of FIG. 4 and differs only in the processing of step S12. In step S12, the electronic controller 86 determines whether or not the identification information included in the obtained operation signal matches the identification information stored in correspondence with the transmission device 80. If the electronic controller 86 determines that the identification information included in the obtained operation signal matches the identification information stored in correspondence with the transmission device 80, then the electronic controller 86 proceeds to step S13. If the electronic controller 86 determines that the identification information included in the obtained operation signal does not match the identification information stored in correspondence with the transmission device 80, then the electronic controller 86 proceeds to step 11.

The processing order for changing the setting information stored in the setting memory of the electronic controller 86 with the external device P will now be described with reference to FIGS. 10 and 11. In a state in which the external device P is connected to the electronic device 60A, if a request for reading the setting information is input to an input portion of the external device P, the external device P transmits the setting information read request to the electronic device 60A. The electronic device 60A reads the setting information from the setting memory and transmits the setting information to the external device P. The external device P shows a setting screen on a display PM of the external device P based on the received setting information.

Figure 10:
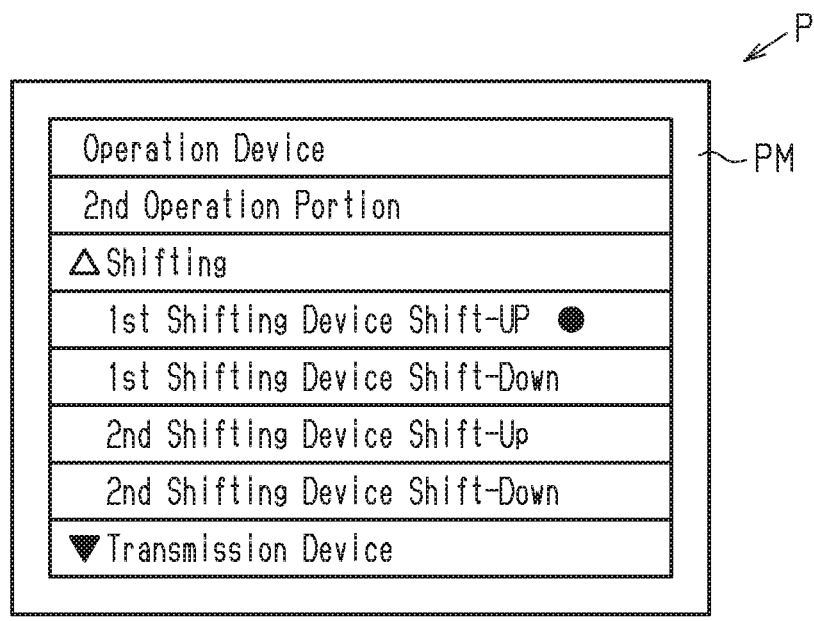
FIG. 10 is a diagram showing a first example of a presentation screen presented on an external device when changing an actuation command executed by the electronic device of FIG. 9.
Figure 11:
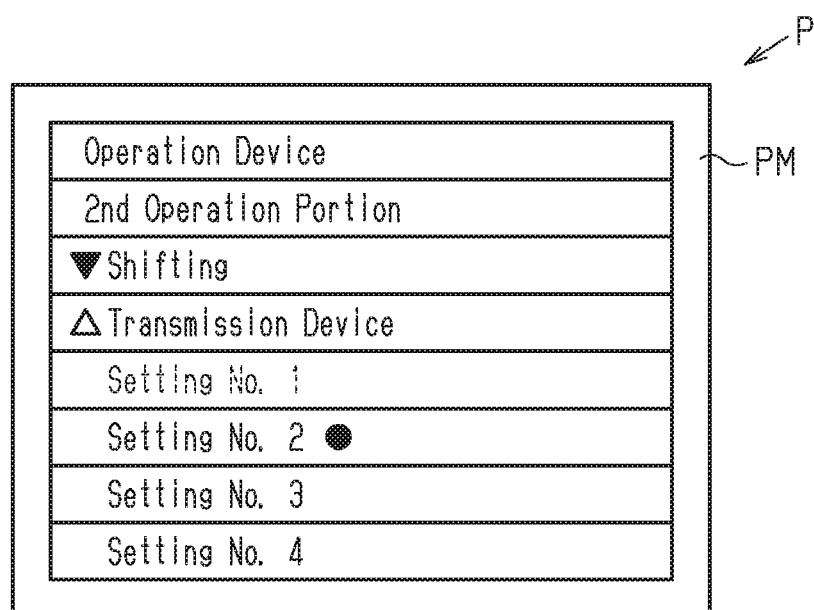
FIG. 11 is a diagram showing a second example of a presentation screen presented on an external device when changing an actuation command executed by the electronic device of FIG. 9.

FIG. 10 shows one example of a setting screen shown in the display PM of the external device P. In FIG. 10, if the setting screen for the second operation portion 84B of the operation device 78 is displayed, a mark (black circle in FIGS. 10 and 11) is shown to indicate that shift-up of the first shifting device 50A has been selected. The setting screen shows items that can be set in correspondence with the second operation portion 84B of the operation device 78. If the shifting devices 50A and 50B can be actuated by operating the second operation portion 84B of the operation device 78, then shifting items are shown on the setting screen. If operation information can be transmitted from the transmission device 80 by operating the second operation portion 84B of the operation device 78, then items of the transmission device 80 are shown on the setting screen. For example, if shifting items is selected from the setting screen, then the items that are shown can be shift-up of the first shifting device 50A, shift-down of the first shifting device 50A, shift-up of the second shifting device 50B, and shift-down of the second shifting device 50B. If the user wishes to change the setting information, then the user moves the black circle on the setting screen shown in FIG. 10 to another item with the input portion of the external device P.

For example, if the user operates the second operation portion 84B of the operation device 78 and wishes to transmit operation information from the transmission device 80, then the user operates the input portion of the external device P and selects the item of the transmission device shown in FIG. 10 to show setting numbers 1 to 4. Setting number 1 has already been set in correspondence with the first operation portion 84A of the operation device 78. Thus, setting number 1 is shown in a light color and cannot be selected. When setting the item of the transmission device 80, the display of the items corresponding to shifting items is closed. In FIG. 11, setting number 2 is marked by the black circle.

After changing the setting information on the setting screen, if a setting information change request is input to the input portion of the external device P, the external device P transmits changed setting information to the setting memory. The setting memory stores the changed setting information.

The setting information of the setting memory can be changed without using the external device P. In this case, for example, a display device is electrically connected to the operation device 78 and the transmission device 80 and the display device shows the setting information. The setting screens shown in FIGS. 10 and 11 are displayed on the display device, and the operation device 78 is used to change the setting information.

An electronic device 60B of a third embodiment will now be described with reference to FIGS. 2 and 12. Same reference numerals are given to those components that are the same as the corresponding components of the first embodiment. The description will focus on parts differing from the first embodiment. In the electronic device 60B of the third embodiment, the electronic device body 82 of the electronic device 60 is incorporated in the operation device 78. The electronic controller 79 and the transmission device 80 are omitted from the electronic device 60.

Figure 12:
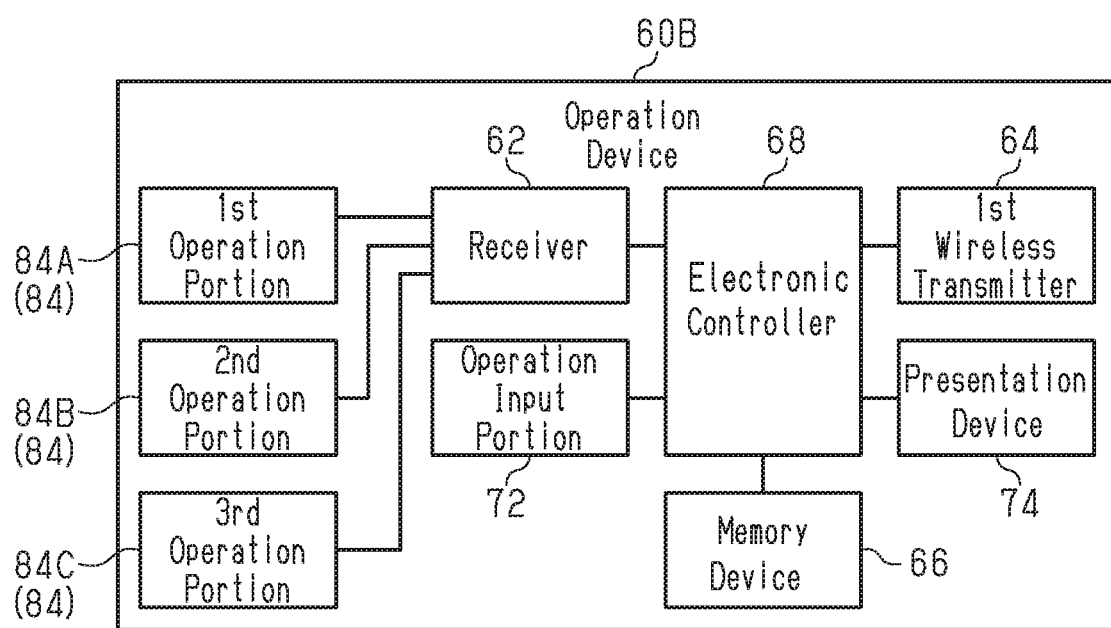
FIG. 12 is a block diagram showing the electric configuration of a third embodiment of an electronic device and bicycle components.

As shown in FIG. 12, the receiver 62, the first wireless transmitter 64, the memory device 66 and the electronic controller 68 are provided on the operation device 78. The receiver 62, the first wireless transmitter 64, the memory device 66 and the electronic controller 68 are arranged on the base 78A (refer to FIG. 2) of the operation device 78.

The operation portions 84 are wire-connected to the receiver 62. Operation of each operation portion 84 transmits an operation signal to the receiver 62. The receiver 62 obtains operation information from the received operation signal. If the receiver 62 receives the operation signal, then the electronic controller 68 reads an actuation command that corresponds to the operation information from the memory device 66 and transmits the actuation command from the first wireless transmitter 64. The electronic device 60B can further include one of the presentation device 74 and the operation input portion 72 shown in FIG. 3. The presentation device 74 and the operation input portion 72 can be separate from the operation device 78.

Modifications

An electronic device and a method for controlling the electronic device according to the present invention are exemplified in each of the above embodiments. However, the present invention is not limited to the above embodiments. Particularly, it should be understood from this disclosure that the present invention can be modified as described below. Same reference numerals are given to those components that are the same as the corresponding components of the above embodiments. Such components will not be described in detail.

Multiple actuation commands can correspond to the same operation information. In this case, the memory device 66 stores the actuation commands that correspond to the operation information. If the receiver 62 receives operation information, then the electronic controller 68 reads the actuation commands corresponding to the operation information and transmits the actuation commands from the first wireless transmitter 64. As a result, the bicycle components 50 included in the actuation signal are actuated in accordance with the actuation signal or one of the bicycle components 50 perform multiple actuation actions. More specifically, in a case in which the first operation information corresponds to the switching of the suspension 50G to a locked state and the lifting of the seatpost 26 of the adjustable seatpost 50F, if the first operation method is performed on the first operation portion 84A, the suspension 50G is switched to the locked state and the seatpost 26 is lifted.

The electronic device 60 can control only one of the bicycle components 50. In this case, the memory device 66 stores only one actuation command. The electronic controller 68 or the external device P updates an actuation command stored in the memory device 66 and changes the stored actuation command in correspondence with the operation information. This changes the bicycle component 50 or the actuation action of the bicycle component 50 that is controlled by the electronic controller 68.

The electronic controller 68 can disable changing of an actuation command that corresponds to operation information and enable changing of an actuation command that corresponds to operation information with only the external device P. Further, the external device P can disable changing of an actuation command that corresponds to operation information and enable changing of an actuation command that corresponds to operation information with only the electronic controller 68.

The presentation device 74 can be omitted from the electronic device body 82 of the first and second embodiments. The operation device 78 and the transmission device 80 can be omitted from the electronic device 60. In this case, the electronic device 60 is configured by only the electronic device body 82. The operation device 78 can be omitted from the electronic device 60A of the second embodiment. In this case, the electronic device 60A is configured by the electronic device body 82 and the transmission device 80. In the electronic devices 60 and 60A of the first and second embodiments, the operation device 78 and the transmission device 80 can be formed integrally. In this case, the second wireless transmitter 76 and the electronic controller 86 are provided on the operation device 78. In the electronic devices 60 and 60A of the first and second embodiments, the electronic controller 86 can be provided on the operation device 78 instead of the transmission device 80.

One of the first shifting device 50A and the second shifting device 50B can be changed to an internal geared hub. The internal geared hub is arranged around the crankshaft 38 or in an axle hub of the rear wheel 14. The internal geared hub changes the coupled state of gears that configure a planetary gear mechanism inside the shifting device. The internal geared hub can include a Continuously Variable Transmission (CVT) mechanism. In one example, the CVT mechanism includes an input body, an output body, and a transmission body. The CVT mechanism rotates the transmission body to continuously vary the transmission ratio.

The setting memory can store the identification information of all of the operation device 78 and the operation portions 84 that are connected and the setting information indicating whether or not the operation information is transmitted in correspondence with the operation of the operation portions 84. Table 6 shows an example of the setting information stored in the setting memory. In this case, the electronic controller 86 compares the information included in the input operation signal with the setting information stored in the setting memory. If the setting indicates transmission of the operation information, then the operation information can be generated and transmitted from the second wireless transmitter 76 through wireless communication.

TABLE 6

| Identification Information of Operation Device and Operation Portions | Necessity of Transmission |
|---|---|
| 2nd Operation Portion of Operation Device | Necessary |
| 3rd Operation Portion of Operation Device | Necessary |
| 1st Operation Portion of Operation Device | Not Necessary |

In the electronic devices 60 and 60A of the first and second embodiments, the operation device 78 and the transmission device 80 perform power line communication. However, the operation device 78 and the transmission device 80 can perform wired communication other than power line communication. In this case, for example, each operation portion 84 of the operation device 78 can be connected to the transmission device 80 by an independent communication line, and the electronic controller 79 can be omitted. If each operation portion of the operation device 78 is connected to the transmission device 80 by an independent communication line, then each operation signal includes a voltage signal output from the switch circuit, and the electronic controller 86 stores the communication lines and the corresponding operation portions.

The electronic devices 60 and 60A of the first and second embodiments are connected to only one operation device 78. However, there can be more than one operation device 78. Each operation device 78 includes unique identification information. Further, there is no limit to the number of the operation portions 84 included in the operation device 78. The operation device 78 can include only one operation portion 84. Alternatively, the operation device 78 can include more than one operation portion 84.

The operation device 78 can be used to change the output of the drive unit 50H. Any operation device 78 can be used as long as it can be operated by the user.

What is claimed is:

1. An operation device for a road bicycle comprising:
    a wireless transmitter;
    a base configured to be removably attached to a handlebar of the road bicycle;
    a brake lever pivotally coupled to the base about a pivot axis;
    a first operation portion that is arranged at a top of a free end of the base, the first operation portion including a button having an operation direction extending substantially towards the pivot axis; and
    an electronic controller electrically connected to the wireless transmitter and configured to cause the wireless transmitter to transmit an actuation command to at least one bicycle component upon operation of the first operation portion, the at least one bicycle component being any one of a shifting device, a brake device, an adjustable seatpost, a suspension and a drive unit that assists propulsion of the bicycle.

2. The operation device according to claim 1, wherein the electronic controller is arranged on the base of the operation device.

3. The operation device according to claim 1, wherein the first operation portions includes a switch circuit, the electronic controller includes a detection circuit that detects voltage output from the switch circuits.

4. The operation device according to claim 1, wherein the first operation portion is operable in accordance with at least one of a first, second and a third operation method that are different with respect to each other.

5. The operation device according to claim 4, wherein the first operation method corresponds to a short push that is a single push of the first operation portion.

6. The operation device according to claim 4, wherein the second operation method corresponds to a long push in which the first operation portion is pushed for a predetermined period or longer.

7. The operation device according to claim 4, wherein the third operation method corresponds to a double click in which the first operation portion is pushed twice during a predetermined period.

8. The operation device according to claim 1, wherein the at least one bicycle component is the drive unit that assists propulsion of the bicycle,
    the actuation command corresponds to a selected operation information of a plurality of operation information for operating the drive unit.

9. The operation device according to claim 1, further comprising
    a second operation portion that is arranged adjacent to the brake lever such that the second operation portion is disposed between the brake lever and the handlebar when the base is attached to the handlebar.

10. The operation device according to claim 9, wherein the second operation portion includes the operation lever.

11. The operation device according to claim 10, further comprising
    a third operation portion that is arranged adjacent to the brake lever such that the third operation portion is disposed between the brake lever and the handlebar when the base is attached to the handlebar.

12. The operation device according to claim 11, wherein at least one of the second and the third operation portions includes the operation lever.

13. The operation device according to claim 12, wherein the second operation portion includes the operation lever and the third operation portion includes another operation lever.

14. The operation device according to claim 9, wherein the electronic controller generates identification information corresponding to the actuation command to identify which of the first and second operation portions has been operated.

15. The operation device according to claim 14, wherein the electronic controller includes a memory device having pre-stored identification information corresponding to the first and second operation portions.

16. The operation device according to claim 15, wherein the memory device is configured to allow the pre-stored identification information to be changed.

* * * * *